United States Patent
Han

(10) Patent No.: US 7,970,208 B2
(45) Date of Patent: Jun. 28, 2011

(54) APPARATUS TO DETECT HOMOGENEOUS REGION OF IMAGE USING ADAPTIVE THRESHOLD

(75) Inventor: Seung-hoon Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 992 days.

(21) Appl. No.: 11/237,942

(22) Filed: Sep. 29, 2005

(65) Prior Publication Data
US 2006/0147113 A1    Jul. 6, 2006

(30) Foreign Application Priority Data

Dec. 28, 2004  (KR) .................. 10-2004-0113795

(51) Int. Cl.
G06K 9/34    (2006.01)
G06K 9/38    (2006.01)
(52) U.S. Cl. ......... 382/173; 382/171; 382/172; 382/270
(58) Field of Classification Search .......... 382/170–173, 382/190, 195, 205, 206, 282
See application file for complete search history.

(56) References Cited

U.S. PATENT DOCUMENTS

| | | | | |
|---|---|---|---|---|
| 4,567,610 A | * | 1/1986 | McConnell | 382/170 |
| 4,741,046 A | * | 4/1988 | Matsunawa et al. | 382/176 |
| 5,027,413 A | * | 6/1991 | Barnard | 382/103 |
| 5,204,738 A | * | 4/1993 | Aragaki | 358/500 |
| 5,915,039 A | * | 6/1999 | Lorie et al. | 382/230 |
| 5,949,905 A | * | 9/1999 | Nichani et al. | 382/173 |
| 6,021,221 A | * | 2/2000 | Takaha | 382/199 |
| 6,347,156 B1 | * | 2/2002 | Kamada et al. | 382/237 |
| 6,870,956 B2 | * | 3/2005 | Qi et al. | 382/170 |
| 6,970,578 B1 | * | 11/2005 | Strand | 382/103 |
| 6,993,169 B2 | * | 1/2006 | Wetzel et al. | 382/128 |
| 7,330,600 B2 | * | 2/2008 | Nishida | 382/274 |

(Continued)

FOREIGN PATENT DOCUMENTS

JP    2002-92609    9/1999

(Continued)

OTHER PUBLICATIONS

Trier and Jain, "Goal-Directed Evaluation of Binarization Methods", IEEE 1995, p. 47-58.*

(Continued)

Primary Examiner — Bhavesh M Mehta
Assistant Examiner — Gandhi Thirugnanam
(74) Attorney, Agent, or Firm — Stanzione & Kim, LLP

(57) ABSTRACT

A homogeneous region detector of an image using an adaptive threshold, and a method of the same. The homogeneous region detector includes a global region standard deviation calculation part to calculate a global region standard deviation of a whole region of an input image, a local region standard deviation calculation part to divide the input image into a predetermined number of local regions and to calculate a local region standard deviation of the each local region, and a homogeneous region determination part to separate the homogeneous region from a feature region in the input image using an adaptive threshold calculated based on entropy of the input image. Accordingly, the homogeneous region can be precisely detected by effectively separating the homogeneous region from the feature region of the input image by using the threshold adaptively calculated based on the entropy of the input image, so that the homogeneous region can be applied to various fields of image processing.

9 Claims, 3 Drawing Sheets

U.S. PATENT DOCUMENTS

| | | | |
|---|---|---|---|
| 7,394,938 B2 * | 7/2008 | Erol et al. | 382/218 |
| 7,474,790 B2 * | 1/2009 | Dalal et al. | 382/225 |
| 7,653,242 B2 * | 1/2010 | Haque | 382/173 |
| 2002/0028008 A1 * | 3/2002 | Fan et al. | 382/131 |
| 2002/0172412 A1 * | 11/2002 | Jun et al. | 382/149 |
| 2003/0174887 A1 * | 9/2003 | Oh et al. | 382/168 |
| 2004/0008892 A1 * | 1/2004 | Hill et al. | 382/228 |
| 2004/0076337 A1 * | 4/2004 | Nishida | 382/274 |
| 2005/0163374 A1 * | 7/2005 | Ferman et al. | 382/176 |
| 2007/0160286 A1 * | 7/2007 | Haque | 382/164 |

FOREIGN PATENT DOCUMENTS

| | | |
|---|---|---|
| JP | 2004-72446 | 1/2004 |
| KR | 1996-27399 | 7/1996 |
| KR | 98-72846 | 11/1998 |
| KR | 1999-69865 | 9/1999 |
| KR | 2004-46271 | 6/2004 |

OTHER PUBLICATIONS

Sahoo, P et al. "Threshold selection using a minimal histogram entropy difference", Optical Engineering 36, 1997 p. 1976-1981.*
Navon et al. "Color image segmentation based on adaptivve local thresholds", Image and Vision Computing 23, 2004, p. 69-85.*
Gonzalez, Rafael and Woods, Richard, "Digital Image Processing", 2002, Prentice Hall, Second Edition, pp. 437-440, 600-606.*
Sezgin, Mehmet and Sankur, Bulent, "Survey over image thresholding techniques and quantitative performance evaluation", Jan. 2004, Journal of Electronic Imaging 13(1), pp. 146-168.*

* cited by examiner

APPARATUS TO DETECT HOMOGENEOUS REGION OF IMAGE USING ADAPTIVE THRESHOLD

CROSS-REFERENCE TO RELATED APPLICATIONS

This application claims benefit under 35 U.S.C. §119(a) of Korean Patent Application No. 2004-113795, filed Dec. 28, 2004, the disclosure of which is incorporated herein in its entirety by reference.

BACKGROUND OF THE INVENTION

1. Field of the Invention

The present general inventive concept relates to an apparatus to detect a homogeneous region of an image, and a method thereof. More particularly, the present general inventive concept relates to a homogeneous region detector capable of correctly detecting a homogeneous region of an image using an adaptive threshold appropriate to properties of the image, and a method thereof.

2. Description of the Related Art

Generally, a homogeneous region in an image is used for a variety of image processing fields. For example, the homogeneous region may be used for estimation of image noise since a signal-to-noise (S/N) ratio of the homogeneous region is low. Also, due to spatial redundancy of the homogeneous region, efficiency of image compression can be improved using the homogeneous region. Furthermore, when detecting scene transition of video, the homogeneous region enhances motion tolerance of frame differences. For image interpolation, an interpolation value can be obtained thorough a simple calculation in the homogeneous region, thereby saving costs. As explained above, the homogeneous region is applied to diverse fields of image processing. Therefore, correct detection of the homogeneous region is an important matter.

FIG. 1 is a view illustrating a conventional method for detecting a homogeneous region of an image. Referring to FIG. 1, a conventional homogeneous region detector 100 comprises a local region standard deviation calculation part 10 and a comparison part 20. The local region standard deviation calculation part 10 divides an input image into M×M regions and calculates the standard deviation of each region. The comparison part 20 compares the standard deviation calculated with respect to the each region to a preset fixed threshold T. A region having a smaller standard deviation than the preset fixed threshold T is determined to be a homogeneous region.

However, with the conventional detecting method using the fixed threshold, it is hard to precisely detect the homogeneous region according to an image or image noise. For example, a texture region could be detected as a homogeneous region, or a real homogeneous region could fail to be detected as the homogeneous region according to the fixed threshold. When detection of the homogeneous region is not correct, noise estimation in the detected region or other post-processing of the image cannot be effectively performed.

SUMMARY OF THE INVENTION

The present general inventive concept provides a homogeneous region detector capable of correctly detecting a homogeneous region of an image, using an adaptive threshold calculated based on entropy of the image, and a method thereof.

Additional aspects of the present general inventive concept will be set forth in part in the description which follows and, in part, will be obvious from the description, or may be learned by practice of the general inventive concept.

The foregoing and/or other aspects of the present general inventive concept may be achieved by providing a homogeneous region detector using an adaptive threshold, the homogeneous region detector including a global region standard deviation calculation part to calculate a global region standard deviation of a whole region of an input image, a local region standard deviation calculation part to divide the input image into a certain number of local regions and to calculate a local region standard deviation of each local region, and a homogeneous region determination part to separate a homogeneous region from a feature region in the input image using the adaptive threshold calculated based on entropy of the input image.

The homogeneous region determination part may include an adaptive threshold calculation part to calculate the adaptive threshold based on the global region standard deviation and an entropy constant K of the input image, and a comparison part to compare the adaptive threshold with the local region standard deviation of each local region and to determine one of the local regions to be the homogeneous region when the adaptive threshold is greater than the respective local region standard deviation.

The adaptive threshold may be calculated by the following expression:

$$T1 = K \frac{\sigma_g}{\log 2\sigma_g}$$

wherein, T1 denotes the adaptive threshold, K denotes the entropy constant, and $\sigma_g$ denotes the global region standard deviation of the input image.

The entropy constant may refer to bit/symbol.

The foregoing and/or other aspects of the present general inventive concept may also be achieved by providing a homogeneous region detector to detect a homogeneous region of an input image, the homogenous region detector including a calculation unit to calculate a global standard deviation of the input image, to calculate a plurality of local standard deviations corresponding to a plurality of local regions of the input image, and to calculate an adaptive threshold based on the calculated global standard deviation and an entropy constant of the input image, and a comparison unit to compare the plurality of local standard deviations to the adaptive threshold calculated by the calculation unit to determine whether the corresponding plurality of local regions of the input image are homogeneous.

The foregoing and/or other aspects of the present general inventive concept may also be achieved by providing a homogenous region detector to detect a homogenous region of an input image, the homogenous region detector including an adaptive threshold calculation unit to calculate an adaptive threshold according to a predetermined property of the input image, a standard deviation calculation unit to divide the input image into a plurality of regions and to calculate a local standard deviation of each region, and a comparison unit to compare the local standard deviation of each region to the adaptive threshold calculated by the adaptive threshold calculation part to determine a homogenous region of the input image.

The foregoing and/or other aspects of the present general inventive concept may be achieved by providing a method of detecting a homogeneous region of an image using an adaptive threshold, the method including calculating a global region standard deviation of a whole region of an input image, dividing the input image into a certain number of local regions and calculating a local region standard deviation of each local region, and separating a homogeneous region from a feature region in the input image using the adaptive threshold calculated based on entropy of the input image.

The separating of the homogeneous region from the feature region may include calculating the adaptive threshold based on the global region standard deviation and an entropy constant of the input image, and comparing the adaptive threshold with the local region standard deviation of each local region and determining one of the local regions to be the homogeneous region when the adaptive threshold is greater than the respective local region standard deviation.

The adaptive threshold may be calculated by the following expression:

$$T1 = K \frac{\sigma_g}{\log 2\sigma_g}$$

wherein, T1 denotes the adaptive threshold, K denotes the entropy constant, and $\sigma_g$ denotes the global region standard deviation of the input image.

The entropy constant may refer to bit/symbol.

The foregoing and/or other aspects of the present general inventive concept may also be achieved by providing a method of detecting a homogenous region of an input image, the method including calculating an adaptive threshold according to a predetermined property of the input image, calculating a plurality of local standard deviations corresponding to a plurality of regions of the input image, and comparing the plurality of local standard deviations to the calculated adaptive threshold to determine a homogenous region of the input image.

BRIEF DESCRIPTION OF THE DRAWINGS

These and/or other aspects of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
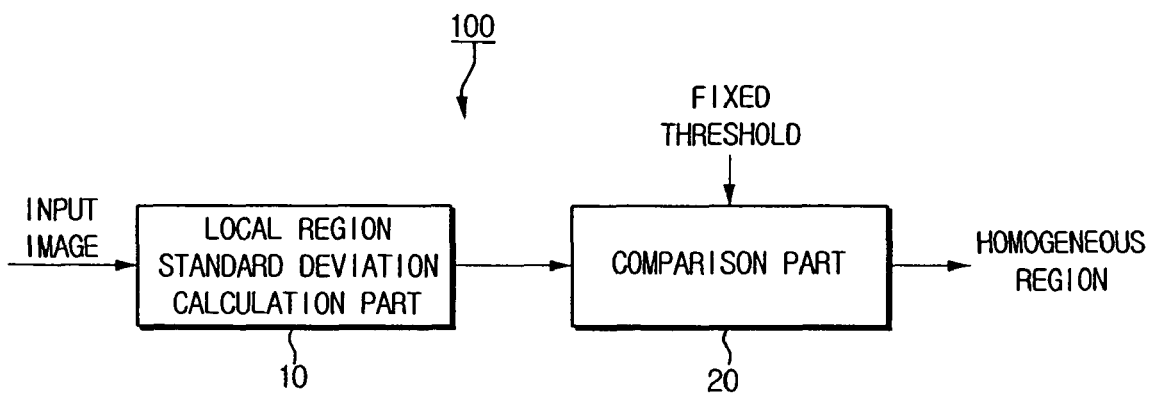
FIG. 1 is a view illustrating a conventional method for detecting a homogeneous region of an image.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 2:
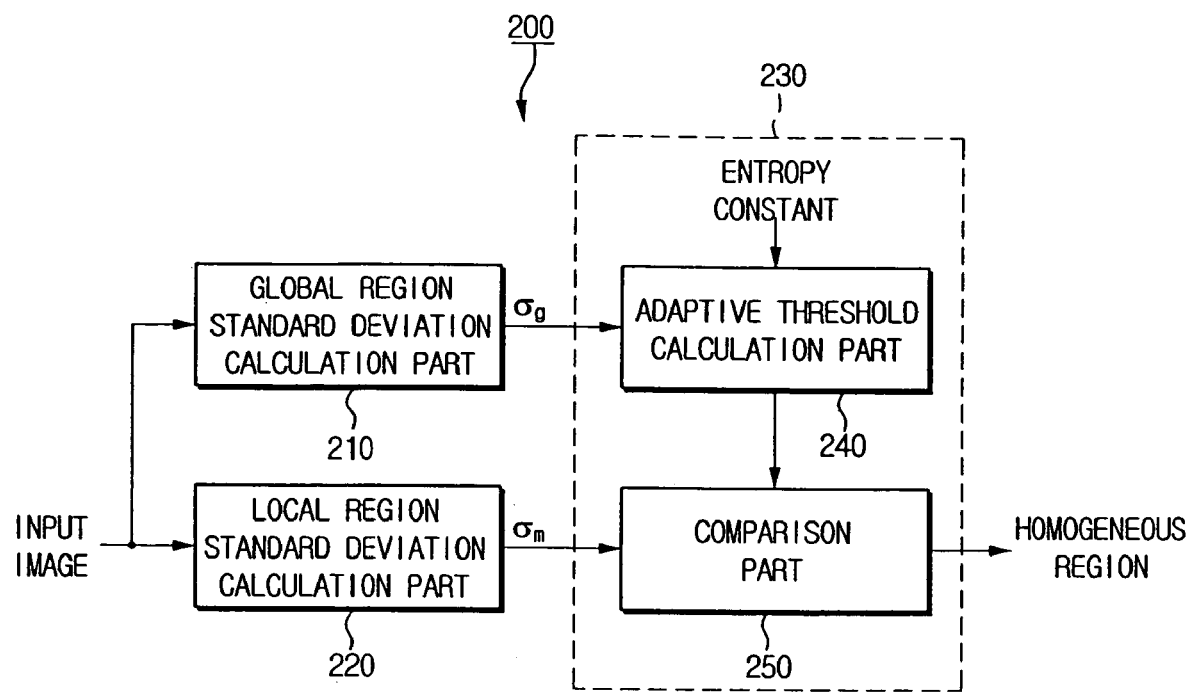
FIG. 2 is a block diagram illustrating a homogeneous region detector using an adaptive threshold, according to an embodiment of the present general inventive concept.

FIG. 2 illustrates a homogenous region detector 200 usable with an image processing apparatus according to an embodiment of the present general inventive concept. Referring to FIG. 2, the homogeneous region detector 200 includes a global region standard deviation calculation part 210, a local region standard deviation calculation part 220 and a homogeneous region determination part 230.

The global region standard deviation calculation part 210 calculates a global region standard deviation $\sigma_g$ of an input image. The global region standard deviation $\sigma_g$ obtained by the global region standard deviation calculation part 210 is input to the homogeneous region determination part 230 to be used to detect a homogeneous region.

The local region standard deviation calculation part 220 divides the input image into M×M regions and calculates a local region standard deviation $\sigma_m$ of each region. The local region standard deviation $\sigma_m$ obtained by the local region standard deviation calculation part 220 corresponding to each region of the input image is input to the homogeneous region determination part 230 to be used to detect the homogeneous region.

The homogeneous region determination part 230 comprises an adaptive threshold calculation part 240 and a comparison part 250. The adaptive threshold calculation part 240 calculates an adaptive threshold T1 based on entropy of the input image. That is, the adaptive threshold calculation part 240 calculates the adaptive threshold T1 on the basis of the global region standard deviation $\sigma_g$ and an entropy constant K of the image. Here, the entropy constant K refers to bit/symbol. That is, the entropy constant K can be a measure of information per symbol in the input image. The comparison part 250 compares the adaptive threshold T1 calculated by the adaptive threshold calculation part 240 with the local region standard deviation $\sigma_m$ of each region of the input image to determine the homogeneous region of the input image. When the local region standard deviation $\sigma_m$ of one of the regions of the input image is less than the adaptive threshold T1, the comparison part 240 determines that the region is a homogeneous region.

Figure 3:
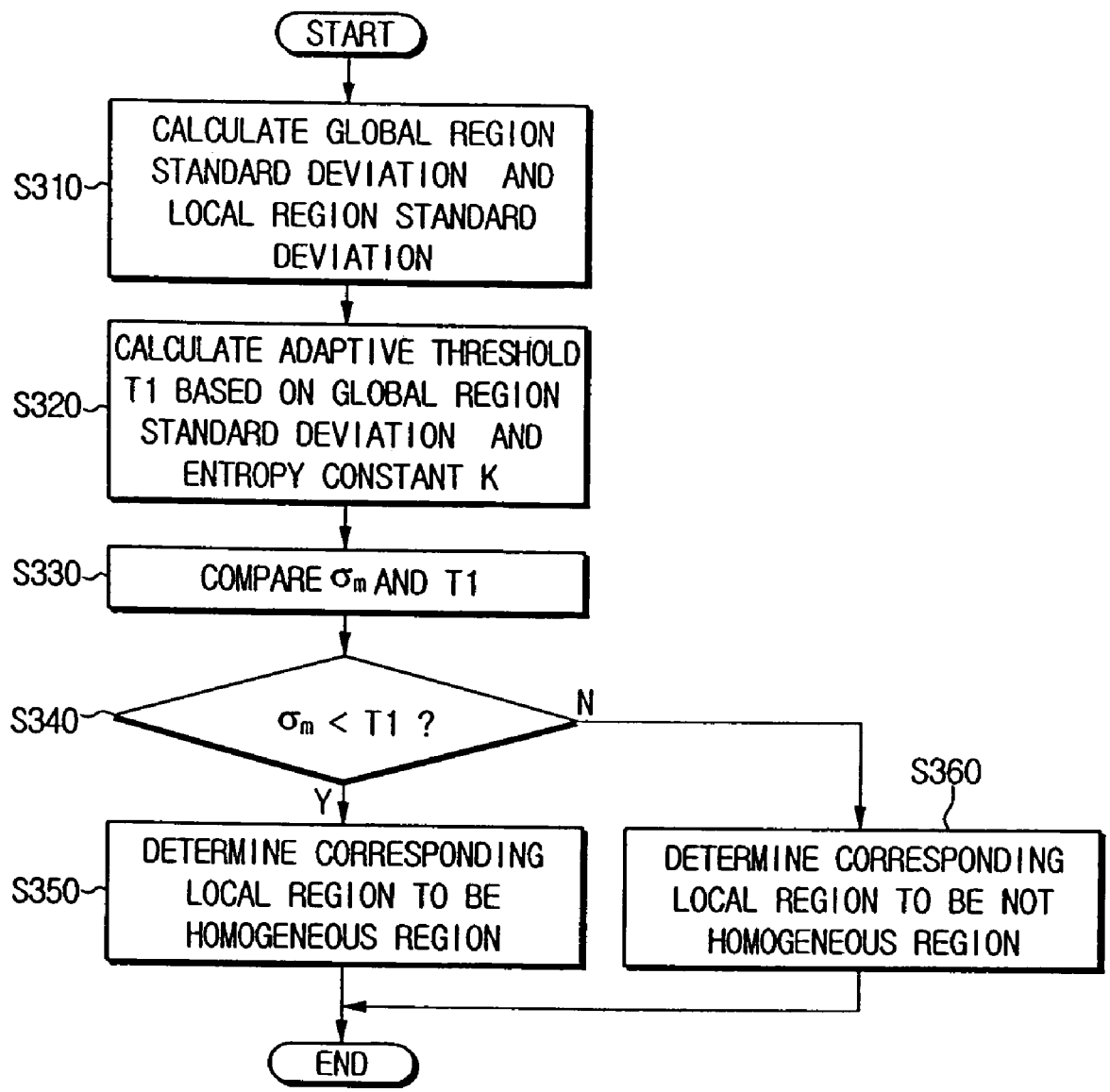
FIG. 3 is a flowchart illustrating a method of detecting a homogeneous region of an image using an adaptive threshold, according to an embodiment of the present general inventive concept.

FIG. 3 is a flowchart illustrating a method of detecting a homogeneous region of an image using an adaptive threshold according to an embodiment of the present general inventive concept. Referring to FIGS. 2 and 3, the global region standard deviation $\sigma_g$ of the input image and the local region standard deviation $\sigma_m$ of each region of the input image are respectively calculated by the global region standard deviation calculation part 210 and the local region standard deviation calculation part 220 (S310). The global region standard deviation $\sigma_g$ of the input image and the local region standard deviation $\sigma_m$ of each region of the input image are then supplied to the homogeneous region determination part 230

The adaptive threshold calculation part 240 in the homogeneous region determination part 230 calculates the adaptive threshold T1 based on the global region standard deviation $\sigma_g$ and the entropy constant K of the input image (S320). The adaptive threshold T1 is calculated by the adaptive threshold calculation part 240 as follows.

A probability distribution $P_g$ of a global region of the input image with respect to brightness and a probability distribution $P_m$ of the homogeneous region with respect to brightness can be calculated from the global region standard deviation $\sigma_g$. Assuming that the global region standard deviation has a wide range, the probability distribution $P_g$ of the global region of the input image with respect to the brightness can be approximated to a uniform density function as illustrated in [Expression 1] below.

$$P_g(x) \cong \frac{1}{2\sigma_g}, \quad -\sigma_g < x < \sigma_g \quad \text{[Expression 1]}$$

wherein, $P_g$ denotes the probability distribution of the global region of the input image, $\sigma_g$ denotes the global region standard deviation of the input image, and x denotes a pixel value of each pixel of the input image.

Assuming that a standard deviation of the homogeneous region has a very narrow range, the probability distribution $P_m$ of the homogeneous region with respect to the brightness can be approximated to the following expression.

$$P_m(x) \cong \frac{1}{2\sigma_g}, \quad -\sigma_m < x < \sigma_m \quad \text{[Expression 2]}$$

The entropy of each local region is calculated based on the probability distributions $P_g(x)$ and $P_m(x)$ of the global and homogeneous regions obtained through [Expression 1] and [Expression 2], respectively, as illustrated in [Expression 3] below.

$$H(m) = -\sum_{x=\sigma_g}^{\sigma_g} P_m \log P_m \cong \frac{\sigma_m}{\sigma_g} \log 2\sigma_g \quad \text{[Expression 3]}$$

In [Expression 3], H(m) denotes the entropy of each local region as divided into M×M regions. When the local region entropy H(m) is an entropy constant K, it can be expressed as the following.

$$H(m) \cong \frac{\sigma_m}{\sigma_g} \log 2\sigma_g \approx K \quad \text{[Expression 4]}$$

Thus, assuming that the local region entropy H(m) is substantially the same as the entropy constant K, when the global region standard deviation $\sigma_g$ and log $2\sigma_g$ are transposed to a term including the entropy constant K, only the local region standard deviation $\sigma_m$ remains on the left term of the expression. The right term can now be expressed as the following.

$$K \frac{\sigma_g}{\log 2\sigma_g} \quad \text{[Expression 5]}$$

Referring to [Expression 5], assuming that the local region entropy H(m) is substantially the same as the entropy constant K, the adaptive threshold T1 can be finally obtained by transposing the global region standard deviation $\sigma_g$ and log $2\sigma_g$ to the term including the entropy constant K. That is the adaptive threshold T1 can be set to be equal to the maximum local region standard deviation $\sigma_m$ of the homogeneous region, which can be obtained by solving for the local region standard deviation $\sigma_m$ in [Expression 4]. Accordingly, the adaptive threshold T1 is $$K \frac{\sigma_g}{\log 2\sigma_g}$$

as shown in [Expression 5].

When the adaptive threshold T1 is calculated at operation S320, the comparison part 250 compares the local region standard deviation am of each region of the input image with the adaptive threshold T1 (S330). When the local region standard deviation $\sigma_m$ corresponding to one of the regions of the input image is less than the adaptive threshold T1 as a result of the comparison (S340), the corresponding local region is determined to be the homogeneous region (S350). When the local region standard deviation is not less than the adaptive threshold T1 as a result of the comparison (S340), the corresponding local region is determined to be not the homogeneous region (S360).

The present general inventive concept may be embodied as executable code in computer readable media including storage media such as magnetic storage media (ROMs, RAMs, floppy disks, magnetic tapes, etc.), and optically readable media (CD-ROMs, DVDs, etc.), and carrier waves (transmission over the Internet).

As described above, according to an embodiment of the present general inventive concept, the homogeneous region of an image can be correctly detected by using a threshold adaptively calculated according to entropy of the image.

Furthermore, a homogeneous region and a feature region of an image, which is not homogeneous, can be effectively separated by using a threshold adaptively calculated according to entropy of the image, thereby precisely detecting the homogeneous region of the image. Accordingly, a homogeneous region can be applied to diverse fields of image processing.

According to an embodiment of the present general inventive concept, since a homogeneous region is determined using only a global region standard deviation and a local region standard deviation, calculation processes can be simplified.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An apparatus to detect homogeneous region of an input image, the apparatus comprising:
    a global region standard deviation calculation part to calculate a global region standard deviation of a whole region of the input image;
    a local region standard deviation calculation part to divide the input image into a predetermined number of local regions and to calculate a local region standard deviation of each local region; and
    a homogeneous region determination part to separate a homogeneous region from a non-homogeneous region in the input image using an adaptive threshold calculated based on an entropy constant of the input image and the global region standard deviation,
    wherein the homogeneous region determination part comprises:
        an adaptive threshold calculation part to calculate the adaptive threshold based on the global region standard deviation and the entropy constant of the input image; and
        a comparison part to compare the calculated adaptive threshold with the local region standard deviation of each local region and to determine one of the local regions to be the homogeneous region when the adaptive threshold is greater than the respective local region standard deviation, wherein the adaptive threshold calculation part calculates the adaptive threshold assuming that a local region entropy calculated based on the adaptive threshold, the global region standard deviation and the local region standard deviation is the same as the entropy constant.

2. An apparatus to detect homogeneous region of an input image, the apparatus comprising:
   a global region standard deviation calculation part to calculate a global region standard deviation of a whole region of the input image;
   a local region standard deviation calculation part to divide the input image into a predetermined number of local regions and to calculate a local region standard deviation of each local region; and
   a homogeneous region determination part to separate a homogeneous region from a non-homogeneous region in the input image using an adaptive threshold calculated based on an entropy constant of the input image and the global region standard deviation,
   wherein the adaptive threshold is calculated by the following expression:

$$T1 = K \frac{\sigma_g}{\log 2\sigma_g}$$

wherein T1 denotes the adaptive threshold, K denotes an entropy constant of the input image, and $\sigma_g$ denotes the global region standard deviation of the input image.

3. The apparatus of claim 2, wherein the entropy constant K comprises a bit/symbol measurement of the input image.

4. A method to detect a homogeneous region of an image using an adaptive threshold in a homogenous region detector, the method comprising:
   calculating a global region standard deviation of a whole region of an input image, dividing the input image into a certain number of local regions, and calculating a local region standard deviation of each local region; and
   separating a homogeneous region from a non-homogeneous region in the input image using an adaptive threshold calculated based on an entropy constant of the input image and the global region standard deviation,
   wherein the above steps are computed by a digital computer,
   wherein the separating of the homogenous region from the non-homogenous region in the image comprises:
      calculating the adaptive threshold based on the global region standard deviation and the entropy constant of the input image; and
      comparing the calculated adaptive threshold with the local region standard deviation $\sigma_m$ of each local region and determining one of the local regions to be the homogeneous region when the adaptive threshold is greater than the respective local region standard deviation, and
   wherein an adaptive threshold calculation part calculates the adaptive threshold assuming that a local region entropy calculated based on the adaptive threshold, the global region standard deviation and the local region standard deviation is the same as the entropy constant.

5. A method to detect a homogeneous region of an image using an adaptive threshold in a homogenous region detector, the method comprising:
   calculating a global region standard deviation of a whole region of an input image, dividing the input image into a certain number of local regions, and calculating a local region standard deviation of each local region; and
   separating a homogeneous region from a non-homogeneous region in the input image using an adaptive threshold calculated based on an entropy constant of the input image and the global region standard deviation,
   wherein the above steps are computed by a digital computer, and
   wherein the adaptive threshold is calculated by the following expression:

$$T1 = K \frac{\sigma_g}{\log 2\sigma_g}$$

wherein, T1 denotes the adaptive threshold, K denotes an entropy constant of the input image, and $\sigma_g$ denotes the global region standard deviation of the input image.

6. The method of claim 5, wherein the entropy constant comprises a bit/symbol measurement of the input image.

7. A computer readable recording medium comprising executable codes to perform a method of detecting a homogenous region of an image, the method comprising:
   calculating a global region standard deviation of a whole region of an input image, dividing the input image into a certain number of local regions, and calculating a local region standard deviation of each local region; and
   separating a homogeneous region from a non-homogeneous region in the input image using an adaptive threshold calculated based on an entropy constant of the input image and the global region standard deviation,
   wherein the separating of the homogenous region from the non-homogeneous region in the image comprises:
      calculating the adaptive threshold based on the global region standard deviation and the entropy constant of the image; and
      comparing the calculated adaptive threshold with the local region standard deviation $\sigma_m$ of each local region and determining one of the local regions to be the homogeneous region when the adaptive threshold is greater than the respective local region standard deviation,
   wherein an adaptive threshold calculation part calculates the adaptive threshold assuming that a local region entropy calculated based on the adaptive threshold, the global region standard deviation and the local region standard deviation is the same as the entropy constant.

8. The apparatus of claim 2, wherein the homogeneous region determination part comprises:
   an adaptive threshold calculation part to calculate the adaptive threshold based on the global region standard deviation and the entropy constant of the input image; and
   a comparison part to compare the calculated adaptive threshold with the local region standard deviation of each local region and to determine one of the local regions to be the homogeneous region when the adaptive threshold is greater than the respective local region standard deviation.

9. The method of claim 5, wherein the separating of the homogenous region from the non-homogeneous region in the image comprises:

calculating the adaptive threshold based on the global region standard deviation and the entropy constant of the input image; and comparing the calculated adaptive threshold with the local region standard deviation $\sigma_m$ of each local region and determining one of the local regions to be the homogeneous region when the adaptive threshold is greater than the respective local region standard deviation.

* * * * *